US008495472B1

(12) United States Patent  (10) Patent No.: US 8,495,472 B1
Magerramov et al.  (45) Date of Patent: Jul. 23, 2013

(54) METHOD AND SYSTEM FOR PERFORMING FINANCIAL RECONCILIATION BETWEEN TWO SYSTEMS USING CHECKSUMS

(75) Inventors: Joseph Magerramov, Seattle, WA (US); Gaurav Jain, Bellevue, WA (US); John M. Nienart, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 202 days.

(21) Appl. No.: 13/072,039

(22) Filed: Mar. 25, 2011

Related U.S. Application Data

(60) Provisional application No. 61/371,468, filed on Aug. 6, 2010.

(51) Int. Cl.
*H03M 13/00* (2006.01)
(52) U.S. Cl.
USPC ........................................... 714/774; 707/101
(58) Field of Classification Search
USPC ............................... 714/774; 707/101, 999.01
See application file for complete search history.

(56) References Cited

U.S. PATENT DOCUMENTS

2006/0101047 A1* 5/2006 Rice .............................. 707/101
2011/0106763 A1* 5/2011 Madan et al. .................. 707/639

* cited by examiner

*Primary Examiner* — Sam Rizk
(74) *Attorney, Agent, or Firm* — McCormick, Paulding & Huber LLP

(57) ABSTRACT

A system and method for performing financial reconciliation of two systems using checksums generally consists of a primary and a secondary system connected via a communications network, wherein each system includes a data source and is adapted to independently calculate one or more checksums pertaining to the data according to the same formula and at the same time. Information, such as data pertaining to financial transactions, may be stored in the primary data source and replicated to the secondary data source via asynchronous messages. The data in the primary and secondary data sources may be reconciled at regular intervals by comparing the checksum calculated by the primary system with the checksum calculated by the secondary system at a given time. If the checksums match, the data is considered to be reconciled. If the checksums do not match, then a recovery process may be initiated to ensure that the data in the primary system is completely and accurately transferred to the secondary system.

25 Claims, 8 Drawing Sheets

METHOD AND SYSTEM FOR PERFORMING FINANCIAL RECONCILIATION BETWEEN TWO SYSTEMS USING CHECKSUMS

CROSS-REFERENCE TO RELATED APPLICATIONS

This application claims priority to U.S. Patent Application No. 61/371,468, which was filed on Aug. 6, 2010, and is incorporated by reference herein in its entirety.

BACKGROUND OF THE INVENTION

Frequently, computer-based systems for storing and reporting important data or information, such as financial or transactional records, include components or other means for duplicating the primary data source, sometimes called a "system of record," in a secondary data source. Such systems may maintain the secondary data source as a backup of the data, sometimes called "source data," in the system of record, for example, to preserve the data and information in the event of a catastrophe, loss or other malfunction. The secondary data source may also be used to perform functions with the information that differ from those that are performed using the source data stored in the system of record. The secondary data source is typically developed by receiving and processing messages from the system of record and may be maintained in the same format as the system of record, or in a different format. Once the secondary data source has been established, its contents may be reconciled against the system of record, and any information that was not copied to the secondary data source as intended may be restored via a recovery process.

Many existing systems for replicating, reconciling and recovering financial data have significant shortcomings. Batch replication, in which information is gathered in collections and transmitted together to the secondary data source, inherently delays the duplication process and can further complicate reconciliation and recovery. Batches may be transferred to the secondary data source at regular intervals, either after a sufficient volume or number of information has been gathered or after a certain period of time has elapsed, and can trail the actual financial transactions by several hours or more. Furthermore, reconciling a batch against the system of record generally cannot occur until an entire batch has been transferred, and if even one item of information (for example, a single transaction) fails to transfer to the secondary data source, then the entire batch is deemed a failure, and all subsequent batches will also be deemed failures until the single lost transaction is identified and transferred.

Synchronous systems are systems that read from, or write to, a source of record and also one or more secondary data sources simultaneously. Such systems provide a greater level of protection in ensuring that all relevant information is sufficiently replicated in all desired data sources. However, synchronous systems may be expensive, and may congest a network or occupy its entire bandwidth during a synchronous transfer, which may drag down the systems' response times to interactions or requests which may pertain to the underlying transaction or other transactions.

Asynchronous systems are preferred and inexpensive means for replicating data, and typically involve recording data in the source of record, generally at real-time or near-real-time, and recording the same data to another data source at a later time. This form of replication is sometimes referred to as "shadowing," and permits the system of record to be replicated when processing power is available to accommodate each individual message, thereby freeing up processing power for time-critical operations associated with a transfer or other activity. Asynchronous data replication from a system of record to a secondary data source is generally performed with asynchronous messaging, such as electronic mail. Lost or unprocessed messages, however, can result in the secondary data source having an incomplete state, or containing a less than full backup of the system of record. Due to the critical nature of financial data and records pertaining to financial transactions, having an incomplete backup of a source of record may be highly undesirable.

The present invention is intended to overcome the aforementioned disadvantages of the prior art by providing an inexpensive alternative to existing systems and methods for data replication, along with easier and more effective methods for reconciling financial information between two systems.

DETAILED DESCRIPTION

Figure 1:
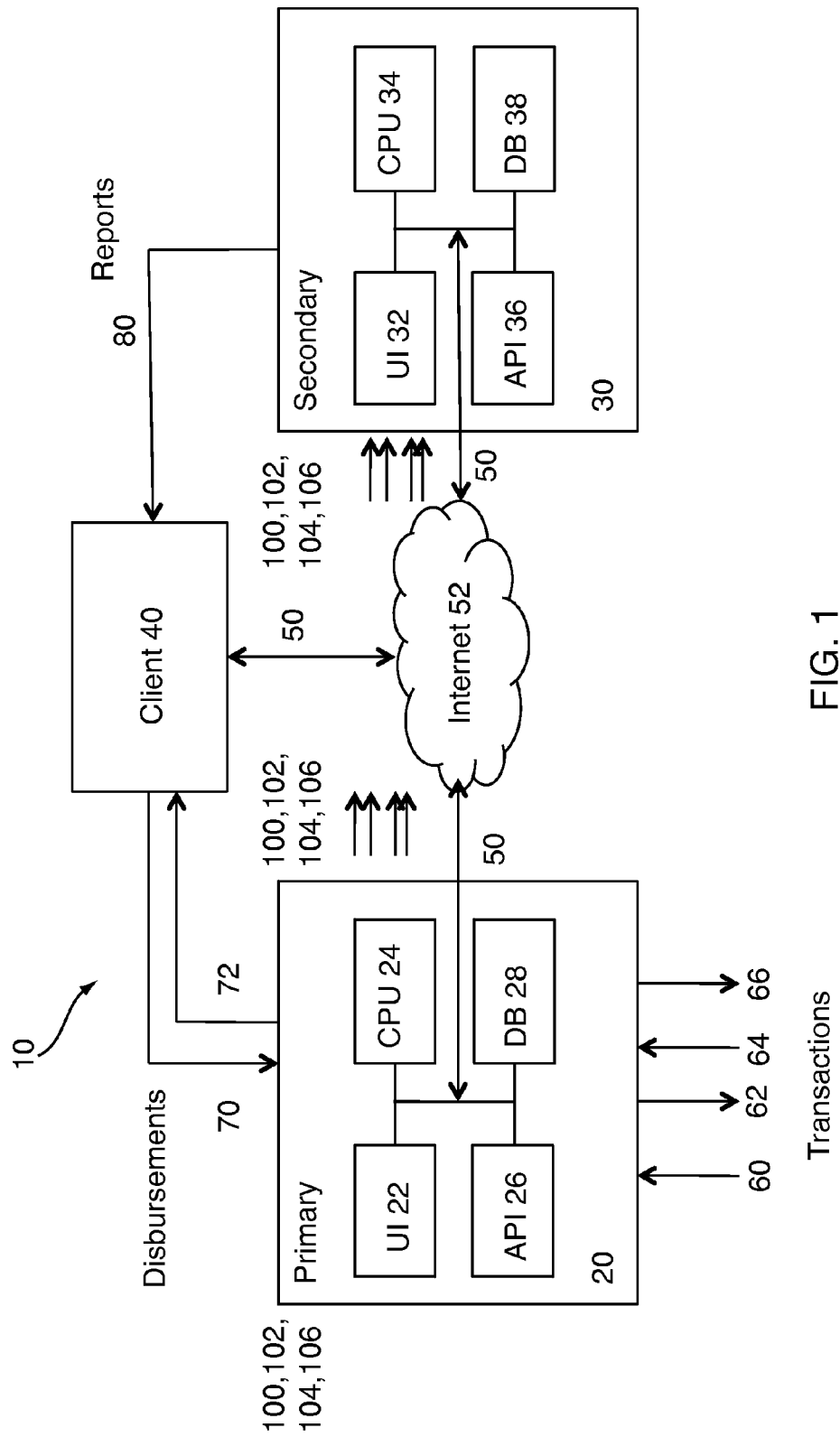
FIG. 1 is a block diagram of the components of a financial system, in accordance with embodiments of the present disclosure.

As is set forth in greater detail below, the present invention includes improved systems and methods for performing financial reconciliation between two systems which utilize asynchronous messaging to replicate a data structure.

According to one embodiment of the present invention, a primary system may record information regarding a series of transactions, and may replicate that information to a secondary system via regular asynchronous messages, such as electronic mail, typically after the information pertaining to the transactions has been recorded in a data source on the primary system. The secondary system may then record the information in a data source on the secondary system and may utilize that information for any purpose, such as to preserve that information as a backup, or to perform functions with that information that may be the same or different from the functions performed by the primary system.

The primary system and the secondary system may each be programmed to independently calculate a "checksum" value relating to one or more aspects of the contents of their respective data sources. The checksums, and the total number of transactions, are computed independently for a given range of values for one or more "key fields" of the transactions. A key field can be any transmitted field with a value that is monotonically non-decreasing, or generally changes in a non-periodic manner over time. For example, the checksum may be computed based on the total dollar amount of the transactions that have been recorded on the primary system, and exemplary key fields may include the clock time at which a transaction took place, the financial period in which the transaction was booked, or a value from an increasing sequence assigned to successively processed transactions, i.e., a logical clock. The checksums are calculated by the primary and secondary systems using identical formulas or methods and may be calculated at regular intervals and stored by the primary system and the secondary system in their respective data sources. Alternatively, the checksums may be calculated in real-time, or in near real-time, and need not be stored in a data source. In general, checksums will not be computed using values from all stored events in the primary system or the secondary system, however.

In order to reconcile information, such as financial records, that are stored in the secondary data source against those of the primary data source, the respective checksums that were calculated by the primary system and the secondary system may be compared to one another. If the checksums match, then the secondary data source may be considered to contain all of the information stored in the primary data source. If the checksums do not match, however, a recovery process may be performed to rectify the reconciliation mismatch.

The systems, computers, servers, and the like described herein have the necessary electronics, software, memory, storage, data sources, firmware, logic/state machines, microprocessors, communication links, displays or other visual or audio user interfaces, printing devices, and any other input/output interfaces to perform the functions described herein and/or achieve the results described herein.

Referring to FIG. 1, a system 10 including a primary system 20 and a secondary system 30 which may be linked over any standard network (e.g., an Intranet or the Internet) or by any standard networking means (e.g., connections via Ethernet, wireless, telephone or cellular means) known to those of skill in the art is shown. The primary system 20 shown in FIG. 1 includes a user interface 22, a central processing unit (CPU) 24, an application programming interface 26 and a data source 28 which acts as a ledger and maintains information pertaining to individual financial transactions. The secondary system 30 shown in FIG. 1 includes a user interface 32, a central processing unit 34, an application programming interface 36 and a data source 38. The primary system 20 and the secondary system 30, as well as client 40, are linked via a communications network 50, which may include the Internet 52.

In the configuration of the system 10 shown in FIG. 1, the primary system 20 and the secondary system 30 perform different functions utilizing the same set of information, which is stored in both primary data source 26 and secondary data source 36. The primary system 20 is adapted to track and receive information relating to individual financial transactions 60, 62, 64, 66, and to issue or receive disbursements 70, 72 to or from client 40. The secondary system 30 is adapted to distribute reports 80 to the client 40. The reports 80 summarize transactions 60, 62, 64, 66 that have been completed on behalf of the client 40, and disbursements 70, 72 that have been issued to or received from the client 40. Reports 80 may include "scheduled" reports that are similar to a standard credit card statement; "real-time" reports that may be delivered at the request of the client 40; "interactive" reports relating to specific requests from the client 40; "non-interactive" reports issued in response to a particular event; or any other type of report.

A transaction 60, 62, 64, 66 may relate to any business event, such as the fulfillment of an order or the placement of a subscription charge. After a transaction 60, 62, 64, 66 has been successfully recorded in the primary data source 28, the primary system 20 delivers a transaction posted message 100, 102, 104, 106 to the secondary system 30, between the primary application programming interface 26 and the secondary application programming interface 36. The transaction posted message 100, 102, 104, 106 contains information regarding the respective individual transactions 60, 62, 64, 66, such as the time and date of the transaction, the amount of the transaction, and any other classifier or related data.

According to one embodiment of the present invention, the primary system 20 and the secondary system 30 are each adapted to independently calculate one or more checksum values P and S pertaining to one or more aspects of the data in the primary data source 28 and the secondary data source 38. For example, the checksum values may be calculated independently for a given range of values of one or more key fields for the transactions, or the dollar value of some or all of the events recorded in the data sources 28, 38. The checksum values may be calculated for scheduled time ranges, at regular intervals (i.e., every minute, every five minutes or every hour), or upon request, and the time or keyword values for which the primary system 20 and the secondary system 30 perform the calculations must be synchronized with a logical clock or a physical clock which tracks the values of the key fields. The checksum values may also be stored in a data source form, such as in a table, along with any related information, and may also be calculated in real-time or near real-time, as necessary.

The checksums P and S calculated by the primary system 20 and the secondary system 30, respectively, using identical formulas or methods may be utilized to reconcile the contents of the secondary data source 38 against those of the primary data source 28 at a particular time. For example, the primary system 20 and the secondary system 30 may compare the respective checksum values calculated by each system for a specific range of key field values, such as time. Preferably, the comparison of checksum values occurs when the secondary system 30 requests that the primary system 20 deliver the checksum P that the primary system 20 calculated for that range, and then compares the checksum P to the checksum S that it calculated for that specific range. If the checksums match (i.e., if P=S for the specific time at which the checksums were calculated), then the reconciliation may be deemed a success, and it can be assumed that the contents of the secondary data source 38 match those of the primary data source 28 for that specific range. If the checksums do not match (i.e., if P≠S), then the reconciliation will be deemed to have failed, and it is understood that the contents of the secondary data source 38 do not match those of the primary data source 28 for that specific range of key field values at the specific time at which the checksums were calculated.

In the event that a reconciliation fails, a recovery protocol may be used to identify and obtain the one or more faulted messages or transactions that caused the failure. Because the information in the primary data source 28 is considered to be immutable source data, a failed reconciliation implies that a message sent by the primary system 20 to the secondary system 30 has been lost, missed or improperly recorded by the secondary system 30.

The independent calculation of checksums by the primary system and the secondary system using identical formulas or methods at regular times or intervals, synchronized with respect to a logical clock or a physical clock, permits the data stored in the primary data source 28 and the secondary data source 38 to be forensically reviewed in the event of a reconciliation failure. In one embodiment of the present invention, checksums P and S are calculated independently by the primary system 20 and the secondary system 30, respectively, and stored in the respective data sources for each one minute interval, according to the time stamp assigned to each transaction, and the checksums P and S are compared to one another at regular intervals, such as once per day (e.g., at midnight daily), once per hour, or once every five minutes, according to synchronized timing based on a logical clock or a physical clock. In another embodiment of the present invention, checksums P and S may be calculated in real-time, or in near real-time, as necessary.

If a successful reconciliation is performed on day one, i.e., if checksums P and S calculated at midnight on day one match, then it is understood that the information contained in primary data source 28 for events that occurred prior to midnight on day one is also successfully replicated in secondary data source 38 as of midnight on day one. However, if a reconciliation that is performed at midnight on day two fails, i.e., if the checksums P and S calculated at midnight on day two do not match, then it is understood that some transaction posted message 100, 102, 104, 106 that was sent from the primary system 20 to the secondary system 30 between midnight on day one and midnight on day two was either lost, missed or improperly recorded by the secondary system 30. Therefore, a recovery process must be undertaken in order to ensure that the data in primary system 20 and secondary system 30 may be reconciled.

There are a number of different variations for the recovery process. First, one approach for identifying a failed transaction posted message is for the secondary system 30 to request that the primary system 20 deliver the checksums P calculated by the primary system 20 in a reverse, descending order counting backward from the time of the failed reconciliation, and compare those checksums to the corresponding checksums S calculated by the secondary system 30 at those respective times. For example, if the reconciliation failed at midnight on day two, then the secondary system 30 may request that the primary system 20 deliver the checksums that it calculated at 11:59 p.m. on day one, at 11:58 p.m. on day one, at 11:57 p.m. on day one, and so on and so forth. Each of the checksums calculated by the secondary system 30 and the primary system 20 at those respective times may then be compared to one another, until a checksum match is identified at a particular time. A checksum match indicates that all of the events that were recorded in the primary system 20 prior to that particular time were successfully replicated in the secondary system 30, and that at least one transaction posted message that was sent after that particular time failed to post in the secondary system 30. The failed transaction posted message (or messages) may then be retransmitted by the primary system 20 to the secondary system 30, and a successful reconciliation may be achieved.

Another approach for initiating recovery from a reconciliation mismatch is to program the secondary system 30 to request that the primary system 20 deliver the checksum P that it calculated at a predetermined interval (such as one hour) prior to the identification of the reconciliation mismatch. For example, if the reconciliation mismatch was identified at midnight on day two, then the secondary system 30 may be programmed to request that the primary system 20 deliver the checksum that it calculated at eleven o'clock p.m. on day one. If the checksums P and S that were calculated at eleven o'clock p.m. on day one do not match, then it is known that the failed transaction occurred before eleven o'clock p.m., and the secondary system 30 may request the checksum P that was calculated, for example, at ten o'clock p.m. on day one. This process may be repeated until a checksum match is found, and the failed transaction is isolated. If the checksums P and S that were calculated at eleven o'clock p.m. on day one match, then it is known that the failed transaction occurred after eleven o'clock p.m. on day one, and the secondary system 30 may further isolate the failed transaction (or transactions) by requesting that the primary system 20 deliver the checksum P that it calculated at an intermediate time between the reconciliation mismatch and the last known reconciliation success (such as 11:30 p.m. on day one), and performing similar reiterations until the failed transaction (or transactions) are identified.

Alternatively, another approach for initiating recovery from a reconciliation mismatch is to program the secondary system 30 to request that the primary system 30 deliver the checksum P that it calculated at an intermediate time between the reconciliation mismatch and the last known reconciliation success. For example, if the reconciliation mismatch was identified at midnight on day two, the secondary system 30 may request that the primary system 20 deliver the checksum P that it calculated at noon on day one. If the checksums P and S that were calculated at noon on day one match, then it is certain that the failed transaction (or transactions) occurred after noon on day one. The secondary system 30 may further isolate the failed transaction (or transactions) by requesting that the primary system 20 deliver the checksum P that it calculated at another intermediate time between the reconciliation mismatch and the last known reconciliation success (such as six o'clock p.m. on day one), and performing similar reiterations until the failed transaction (or transactions) are identified by a successful reconciliation.

If the checksums P and S that were calculated at noon on day one do not match, then it is known that at least one failed transaction occurred before noon on day one. Therefore, the secondary system 30 may further isolate the failed transaction (or transactions) by requesting that the primary system 20 deliver the checksum P that it calculated at another intermediate time between the reconciliation mismatch and the last known reconciliation success (such as six o'clock a.m. on day one), and performing similar reiterations until the failed transaction (or transactions) are identified, and the transaction posted message (or messages) that failed to post in secondary system 30 may be retransmitted from the primary system 20 to the secondary system 30. However, while the identification of a reconciliation mismatch at noon on day one confirms that at least one failed transaction occurred before noon on day one, such a mismatch does not guarantee that additional failures did not also occur after noon on day one. Each sub-interval of the reconciled time must be verified independently in order to confirm that the contents of the secondary data source 38 match those of the primary data source 28 for the specific range of key field values.

For example, after a failed transaction posted message (or messages) is identified and retransmitted from the primary system 20 to the secondary system 30, the secondary system 30 may then recalculate the checksum S as of midnight on day two, and compare that checksum S to the checksum P calculated by the primary system 20 at midnight on day two. If the checksum P calculated by the primary system 20 matches the checksum S calculated by the secondary system 30, then it is known not only that the retransmitted transaction posted messages were successfully recorded in the secondary system 30, but also that no other transaction posted messages failed to post in the secondary system after that time, and that the primary data source 28 is successfully replicated in the secondary data source 38.

Figure 2:
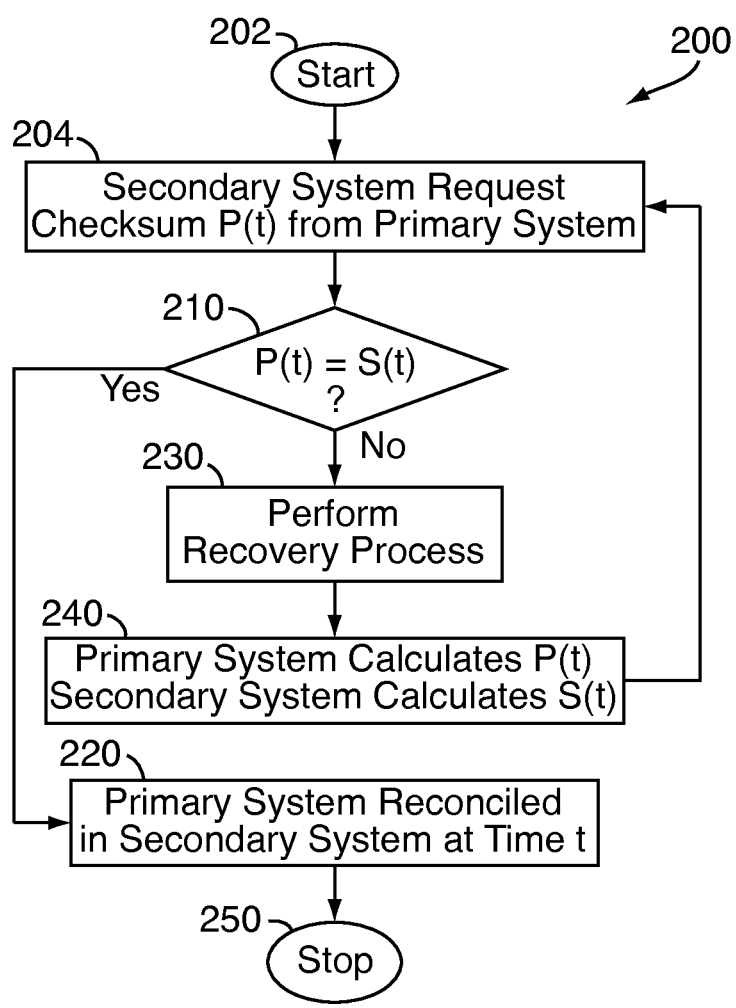
FIG. 2 is a flow chart of a method of performing financial reconciliation using checksums in accordance with an embodiment of the present disclosure.

Referring to FIG. 2, a flow chart 200 illustrating one embodiment of a method for performing a reconciliation between a primary system and a secondary system according to the present disclosure is shown. In the method described by flow chart 200, it is understood that the primary system and the secondary system each compute checksums at synchronized times and at regular intervals, according to the same formula. At step 204, the secondary system requests that the primary system deliver the checksum P that it calculated according to the formula at time t, or P(t). At step 210, the value of the primary checksum P that was calculated according to the formula at time t, or P(t), is compared to S(t). If the primary checksum P matches the secondary checksum S calculated at time t, or if P(t)=S(t), then the method advances to step 220, and it is known that the primary system was fully replicated in the secondary system at time t. If the primary checksum P does not match the secondary checksum S calculated at time t, or if P(t)≠S(t), then the method advances to step 230, where a recovery process is performed. Upon completion of the recovery process, the secondary system recalculates the value of the secondary checksum S at time t according to the formula, and the method returns to step 204. The steps 204, 210, 230 and 240 of flow chart 200 shown in FIG. 2 may then be repeated until the primary checksum P calculated at time t matches the secondary checksum S calculated at time t, or until P(t)=S(t), at which point it is known that the primary system was fully replicated in the secondary system at time t.

Recovery processes according to the present disclosure generally begin with the identification of a reconciliation failure, or a checksum mismatch, i.e., when a primary checksum P calculated according to a formula at a synchronized time is not equal to a secondary checksum S calculated according to the same formula at the synchronized time, or when P=S, based on the respective contents of the primary system and the secondary system as of the synchronized time. According to a preferred embodiment of the present disclosure, a recovery process attempts to identify a previous time when a checksum match existed, i.e., a time preceding the reconciliation failure at which the primary checksum P and the secondary checksum S were equal, or when P=S, and to retransmit information pertaining to all of the records that were recorded in the primary system between the time of the identified checksum match and the time of the identified checksum mismatch. Therefore, according to this embodiment, the recovery process may be simplified, or made more efficient, by identifying the latest time at which a checksum match existed prior to the identification of the checksum mismatch, which may reduce the amount of information and/or the number of messages that must be sent in order to reconcile the contents of the primary system with those of the secondary system.

According to another preferred embodiment of the present disclosure, a recovery process attempts to identify a previous time when a checksum match existed, and to retransmit information pertaining to records that were recorded in the primary system for a predetermined interval following the time of the identified checksum match. After the information pertaining to records for that predetermined interval has been retransmitted, the secondary system then recalculates the secondary checksum S at a time corresponding to the conclusion of that interval, or at a time following the conclusion of that interval, and compares the recalculated secondary checksum S to the primary checksum P that was calculated by the primary system at that time. If the recalculated secondary checksum matches the primary checksum, then it is known that the recovery process was a success, and that the primary data source was replicated in the secondary data source at that time. Therefore, according to this embodiment, the recovery process may be simplified, or made more efficient, by identifying the latest time at which a checksum match existed, and retransmitting information corresponding to an interval following the time of the latest known checksum match, which may further reduce the amount of information and/or the number of messages that must be sent in order to replicate the contents of the primary system in the secondary system.

According to yet another preferred embodiment of the present disclosure, a recovery process attempts to identify both the latest time at which a checksum match is known to have existed, and the earliest time at which a checksum mismatch is known to have existed, through a series of iterations. For example, a recovery process may attempt to compare the primary checksum and the secondary checksum calculated at or near a midpoint in time between a known checksum match and a known checksum mismatch. If the primary checksum calculated at a time at or near the midpoint matches the secondary checksum calculated at that time, then it is known that at least one transaction posted message failed to post in the secondary system after that time. If the primary checksum calculated at a time at or near the midpoint does not match the secondary checksum calculated at that time, then it is known that at least one transaction posted message failed to post in the secondary system before that time. By comparing primary checksums and secondary checksums at or near a midpoint between a known checksum mismatch and a known checksum match, the window within which the earliest transaction posted message that was not recorded in the secondary system may be geometrically narrowed. Therefore, according to this embodiment, the recovery process may be further simplified, or made more efficient, by reducing the period over which information and/or messages must be retransmitted in order to reconcile the contents of the primary system with those of the secondary system.

Those of skill in the art will recognize that the systems and methods for performing financial reconciliation disclosed herein provide a number of advantages over the use of existing batch replication systems, in which a secondary system receives batches of messages from a primary system to a secondary system at various intervals. In a batch system, a reconciliation between a primary system and a secondary system cannot be performed until an entire batch has been transferred. Furthermore, if even one item of information (for example, a single transaction) is not successfully recorded in the secondary system, then the entire batch is deemed a failure, and all subsequent batches will also be deemed failures until the single lost transaction is identified and transferred. Conversely, the systems and methods of the present disclosure enable a reconciliation to be performed on asynchronous systems at any convenient time. Furthermore, the recovery processes which may be utilized according to the systems and methods of the present disclosure are simpler and more efficient than those which may be performed on batch replication systems, in that the amount of information and/or the number of messages that must be retransmitted in order to successfully replicate a primary system in a secondary system may be significantly reduced, and the amount of time required to complete a recovery process may also be reduced.

Figure 3:
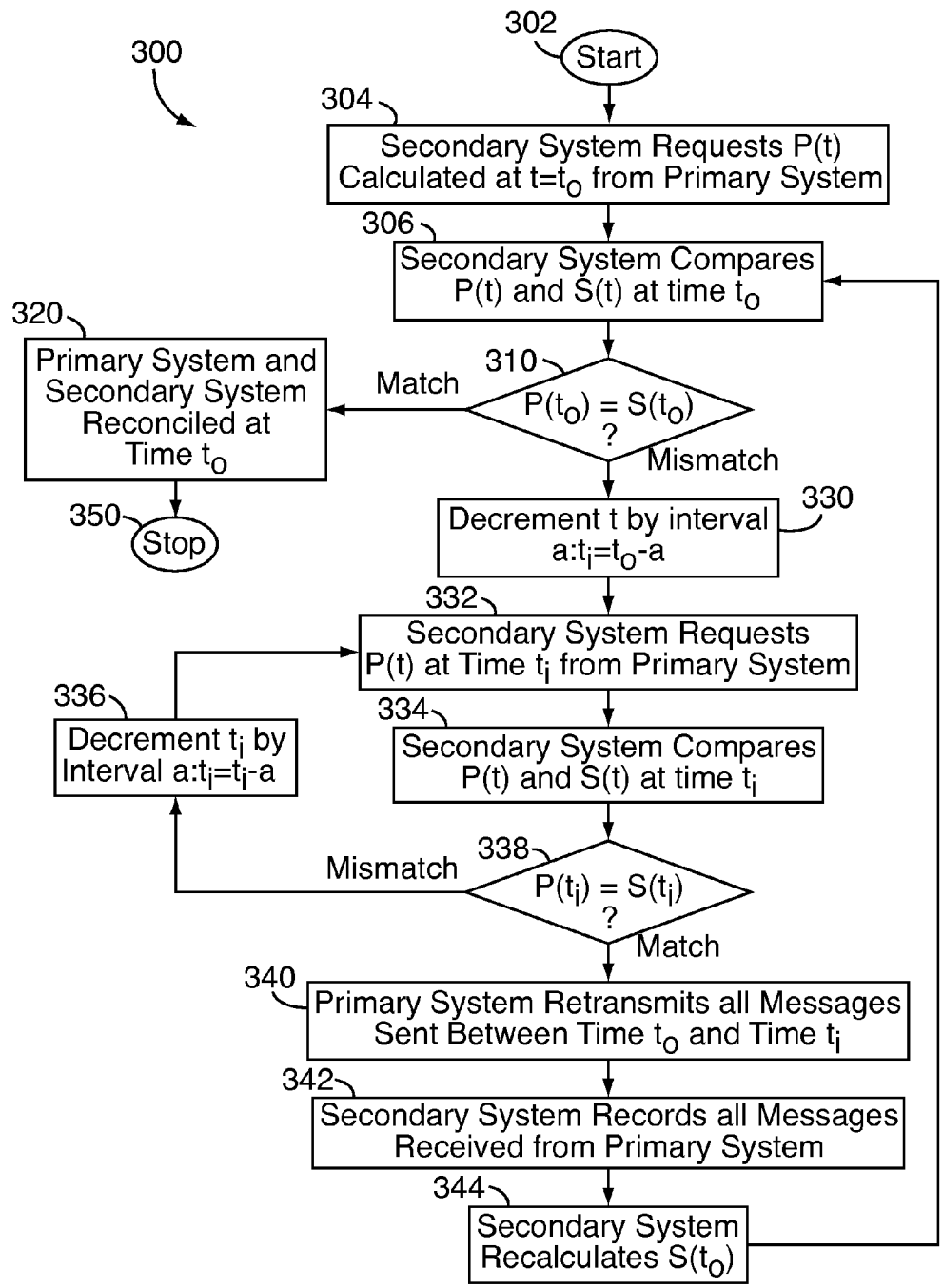
FIG. 3 is a flow chart of a method of performing financial reconciliation using checksums in accordance with an embodiment of the present disclosure.

Referring to FIG. 3, a flow chart 300 illustrating another embodiment of a method for performing a reconciliation between a primary system and a secondary system according to the present disclosure is shown. In the method described by flow chart 300, it is understood that the primary system and the secondary system each compute checksums at synchronized times, according to the same formula.

At step 304, the secondary system requests that the primary system deliver the checksum P that it calculated according to the formula at time $t_o$, or $P(t_o)$. The secondary system then compares the value of the secondary checksum S that it calculated according to the formula at time $t_o$, or $S(t_o)$, to the checksum P calculated by the primary system at time $t_o$, or $P(t_o)$, at step 306.

At step 310, if the primary checksum calculated at time $t_o$ matches the secondary checksum calculated at time $t_o$, or if $P(t_o)=S(t_o)$, then the method advances to step 320, where a match between the primary checksum and the secondary checksum is declared, and the primary system is deemed to have been reconciled in the secondary system at time $t_o$. If the primary checksum calculated at time $t_o$ does not match the secondary checksum calculated at time $t_o$, or if $P(t_o) \neq S(t_o)$, then a recovery process is initiated.

In the method shown in the flow chart 300, the recovery process operates by comparing the checksums calculated by the primary system and the secondary system at intervals in a reverse, descending order counting backward from the time that the checksum mismatch was identified. At step 330, the time at which the checksums are compared is decremented by interval a to a test time $t_i$ where $t_i=(t_o-a)$. At step 332, the secondary system requests that the primary system deliver the checksum P that it calculated according to the formula at time $t_i=(t_o-a)$, or $P(t_i)$. The secondary system then compares the value of the secondary checksum S that it calculated according to the formula at time $t_i=(t_o-a)$, or $S(t_i)$, to the checksum P calculated by the primary system at time $t_i=(t_o-a)$, or $P(t_i)$, at step 334.

At step 338, if the primary checksum calculated at time $t_i=(t_o-a)$ does not match the secondary checksum calculated at time $t_i=(t_o-a)$, or if $P(t_i) \neq S(t_i)$, then the test time $t_i$ at which the primary and secondary checksums are compared is decremented by interval a to time $(t_i-a)$, or to time $(t_o-2a)$, at step 336, and steps 332, 334 and 338 are repeated as necessary.

However, if the primary checksum calculated at time $t_i=(t_o-a)$ matches the secondary checksum calculated at time $t_i=(t_o-a)$, or if $P(t_i)=S(t_i)$, then, at step 340, the primary system retransmits all of the messages that were sent between time $t_o$ and time $t_i$. At step 342, the secondary system records all of the messages that it receives from the primary system, and at step 344, the secondary system recalculates the value of the secondary checksum S at time $t_o$, or $S(t_o)$. The method then returns to step 306, where the secondary system then compares the value of the secondary checksum S that it calculated according to the formula at time $t=t_o$, or $S(t_o)$, to the checksum P calculated by the primary system at time $t=t_o$, or $P(t_o)$. At step 310, if the primary checksum calculated at time $t_o$ matches the secondary checksum that was calculated at time $t_o$, then the primary system is declared to have been reconciled with the secondary system as of time $t_o$, and the recovery process was deemed a success.

Figure 4:
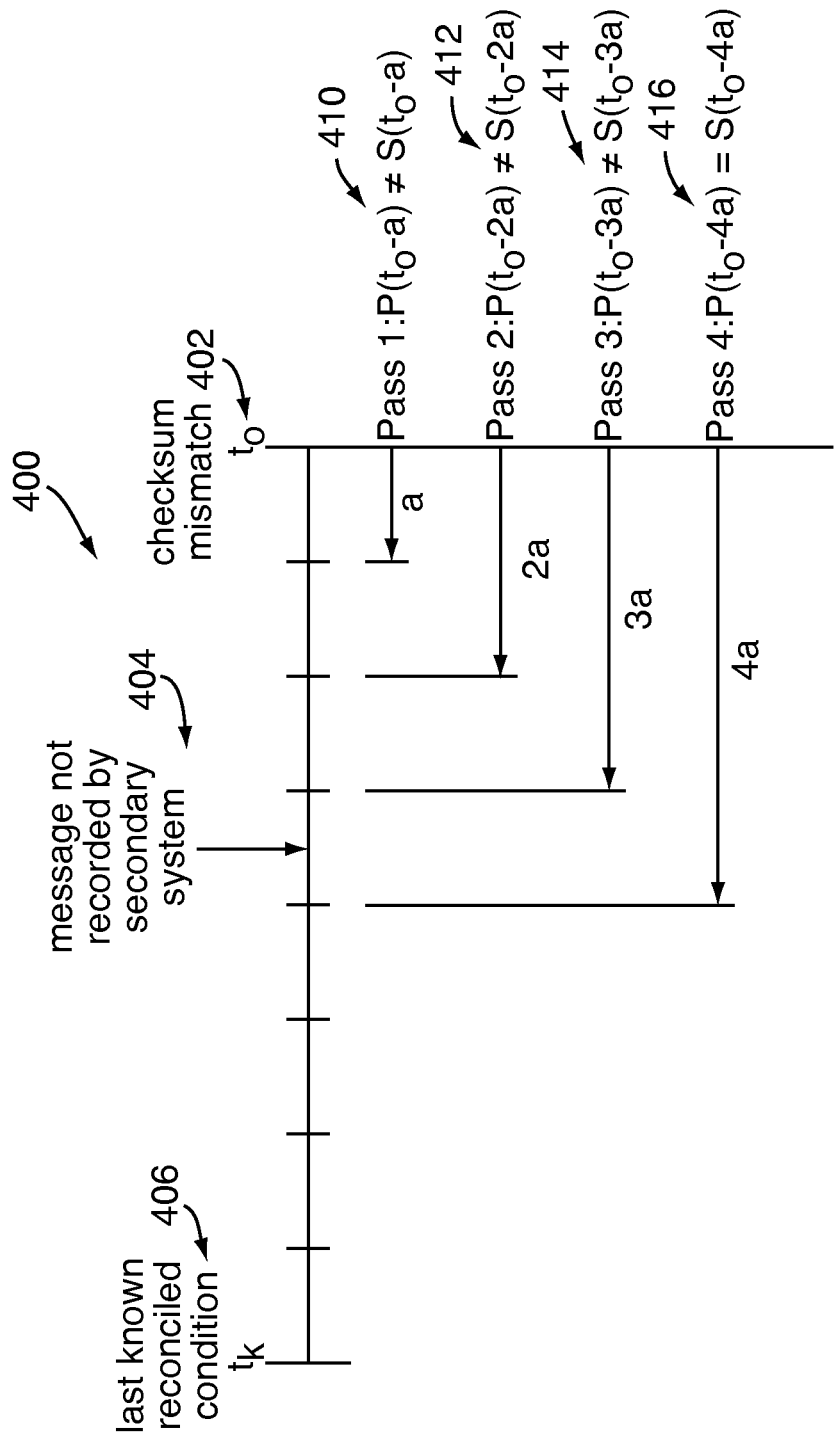
FIG. 4 is a time line of a recovery process in accordance with an embodiment of the present disclosure.

Referring to FIG. 4, a time line 400 that extends from time 406, which represents the time $t_k$ of the last-known reconciled condition of the primary system and the secondary system, and time 402, which represents the time $t_o$ at which a checksum mismatch is identified, is shown. Additionally, the time line 400 also represents the time 404 at which a message was not recorded by the secondary system. As is shown in FIG. 4, time 404 occurred at a point between time 406 corresponding to the last-known reconciled condition of the primary system and the secondary system, and time 402 corresponding to the time at which a checksum mismatch was first identified.

The time line 400 shown in FIG. 4 may represent the events associated with a recovery process according to a method similar to that represented by flow chart 300 in FIG. 3, in which the time at which checksums are compared is decremented by interval a. As such, time line 400 represents a recovery process in which the checksums calculated by the primary system and the secondary system at intervals a are compared in a reverse, descending order counting backward from the time of the identified checksum mismatch.

According to FIG. 4, in a first pass 410, the primary checksum P and secondary checksum S previously calculated by the primary system and the secondary system, respectively, at time $(t_o-a)$ are compared. When a checksum mismatch is identified in the first pass 410, the time at which checksums are compared is further decremented by another interval a, and the checksums that were previously calculated by the primary system and the secondary system, respectively, at time $(t_o-2a)$ are compared in a second pass 412.

When a checksum mismatch is again identified in the second pass 412, the time at which checksums are compared is further decremented by another interval a, and the checksums that were previously calculated by the primary system and the secondary system, respectively, at time $(t_o-3a)$ are compared in a third pass 414. When a checksum mismatch is again identified, the time at which checksums are compared is further decremented by another interval a. At fourth pass 416, the primary checksum P and secondary checksum S calculated at time $(t_o-4a)$ are compared, and a checksum match is identified. At this point, information pertaining to all of the financial transactions that were recorded in the primary system at time $t_o$, but were not recorded in the primary system at time $(t_o-4a)$, may be retransmitted from the primary system to the secondary system and recorded there. The secondary system may then recalculate the checksum S corresponding to the status of the secondary system as of time $t_o$, and the checksums calculated by the primary system and the secondary system corresponding to time $t_o$, or $P(t_o)$ and $S(t_o)$, may then be compared to determine whether the recovery process succeeded in reconciling the primary data source with the secondary data source. If a checksum mismatch is identified again at time $t_o$, the entire process may be repeated.

Alternatively, the method shown in flow chart 300 of FIG. 3 could be modified to reduce the amount of information and/or the number of messages which must be retransmitted from the primary system to the secondary system during the recovery process. Referring to FIG. 4, a checksum mismatch was identified at time $(t_o-3a)$ in third pass 414 and a checksum match was identified at time $(t_o-4a)$ fourth pass 416. Therefore, according to one embodiment of the present invention, the primary system may retransmit information pertaining to all of the financial transactions that were recorded in the primary system between time $(t_o-3a)$ and time $(t_o-4a)$, instead information pertaining to all of the financial transactions that were recorded in the primary system between time $t_o$ and time $(t_o-4a)$. The secondary system may then recalculate the checksum S corresponding to the status of the secondary system as of time $t_o$, and the checksums calculated by the primary system and the secondary system corresponding to time $t_o$, or $P(t_o)$ and $S(t_o)$, may then be compared to determine whether the recovery process succeeded in reconciling the primary system with the secondary system. Such an embodiment provides the added advantage of reducing the amount of information and/or the number of messages which must be retransmitted in order to reconcile the primary system with the secondary system, as well as the amount of time required to complete the recovery process. If a checksum mismatch is identified again at time $t_o$, the entire process may be repeated.

Figure 5:
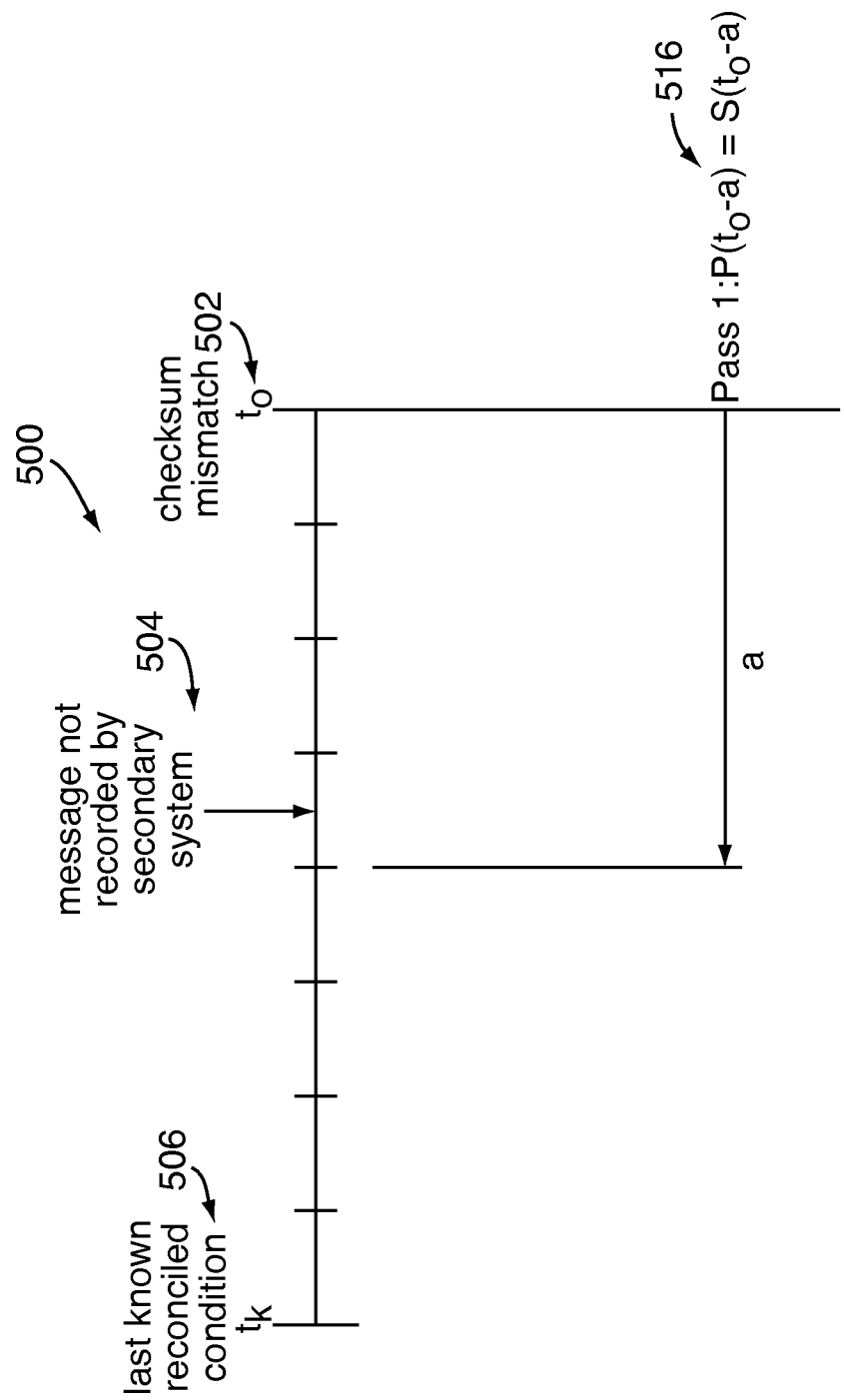
FIG. 5 is a time line of a recovery process in accordance with an embodiment of the present disclosure.

A recovery process need not compare every set of checksums calculated by the primary and secondary systems, and may instead compare sets of checksums calculated by the primary and secondary systems at any interval. Referring to FIG. 5, a time line 500 extending from time 506, which represents the time $t_k$ of the last-known reconciled condition between the primary system and the secondary system, and time 502, which represents the time $t_o$ that a checksum mismatch is identified. Additionally, the time line 500 also represents the time 504 at which a message was not recorded by the secondary system.

In the time line 500 shown in FIG. 5, the time at which the primary and secondary checksums are compared is decremented by interval a, where a may span four intervals at which the checksums were calculated by the primary system and the secondary system. At first pass 516, the primary checksum P and secondary checksum S calculated at time ($t_o$−a) are compared, and a checksum match is identified. At this point, information pertaining to all of the financial transactions which were recorded in the primary system at time $t_o$, but were not recorded in the primary system at time ($t_o$−a), is transmitted from the primary system to the secondary system, and recorded there. The secondary system may then recalculate the checksum S corresponding to the status of the secondary system as of time $t_o$, and the checksums calculated by the primary system and the secondary system corresponding to time $t_o$ may then be compared to determine whether the recovery process succeeded in reconciling the primary system in the secondary system.

A recovery process that operates according to time line 500 has the advantage of identifying a time 504 at which a reconciled condition was known to exist more quickly than a recovery process that operates, for example, according to the time line 400 shown in FIG. 4, but may require more information to be sent to the secondary system and recorded there during the recovery process in order to reconcile the primary data source with the secondary data source.

Figure 6:
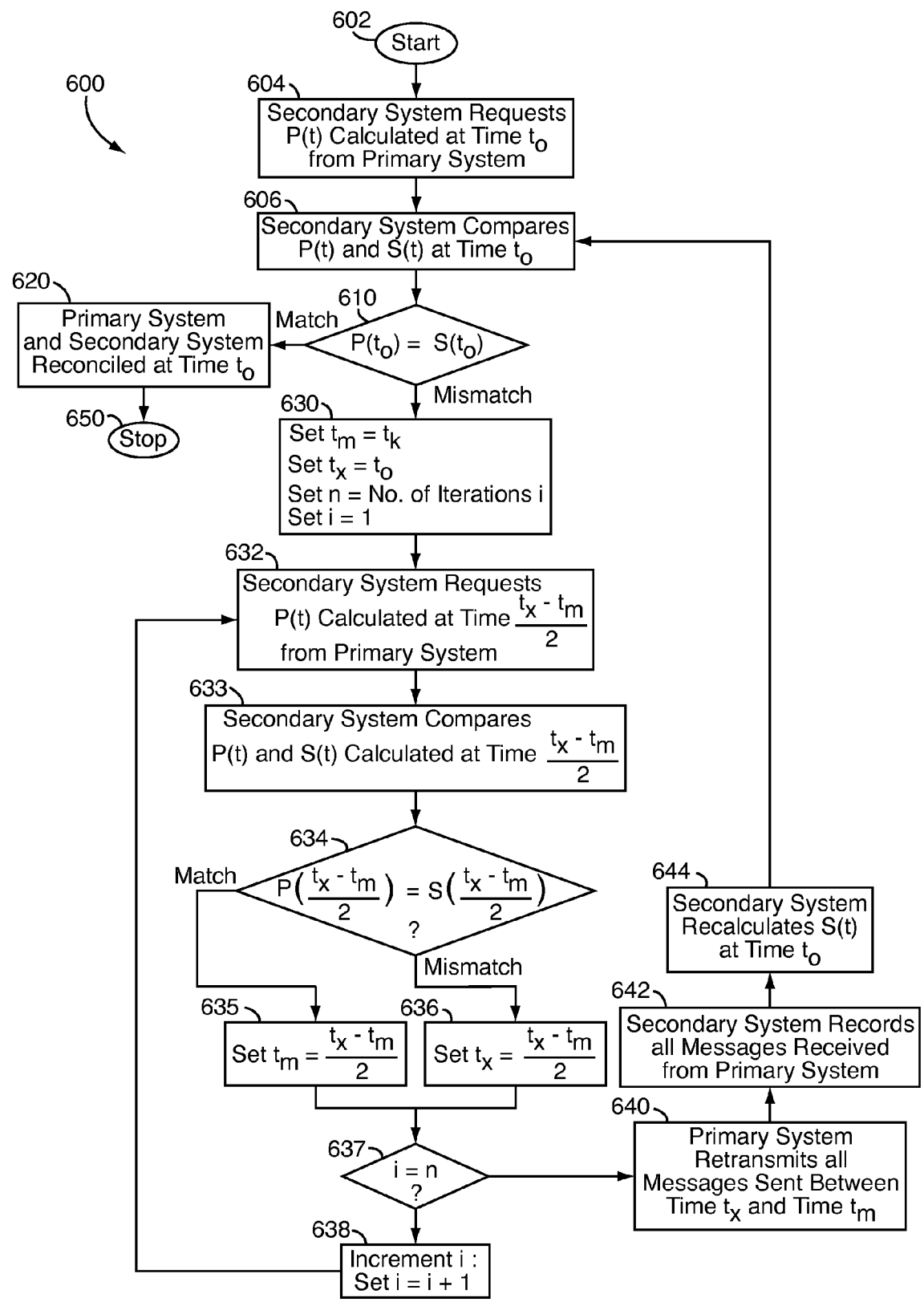
FIG. 6 is a flow chart of a method of performing financial reconciliation using checksums in accordance with an embodiment of the present disclosure.

Referring to FIG. 6, a flow chart 600 illustrating another embodiment of a method for performing a reconciliation between a primary system and a secondary system according to the present disclosure is shown. In the method described by flow chart 600, it is also understood that the primary system and the secondary system each compute checksums at synchronized times, according to the same formula. In the event that a reconciliation failure is identified, the method described by flow chart 600 attempts to narrow the interval between the latest known reconciliation success and the earliest known reconciliation failure, within which a transaction posted message (or messages) failed to post in the secondary system, in order to reduce both the length of the recovery process and the amount of information or number of messages that must be retransmitted to the secondary system in order to ensure that the primary data source is successfully replicated in the secondary data source. The method described by flow chart 600 thus narrows this interval by comparing the primary checksum calculated by the primary system and the secondary checksum calculated by the secondary system at or near a midpoint between the times of the latest known checksum match and the earliest known checksum mismatch, and may repeat this comparison over one or more iterations.

At step 604, the secondary system requests that the primary system deliver the checksum P that it calculated according to the formula at time $t_o$, or $P(t_o)$. The secondary system then compares the value of the secondary checksum S that it calculated according to the formula at time $t_o$, or $S(t_o)$, to the checksum P calculated by the primary system at time $t_o$, or $P(t_o)$, at step 606.

At step 610, if the primary checksum calculated at time $t_o$ matches the secondary checksum calculated at time $t_o$, or if $P(t_o)=S(t_o)$, then the method advances to step 620, where a match between the primary checksum and the secondary checksum is declared, and the primary system and the secondary system are deemed to have been reconciled at time $t_o$. If the primary checksum calculated at time $t_o$ does not match the secondary checksum calculated at time $t_o$, or if $P(t_o)\neq S(t_o)$, then a recovery process is initiated.

In the method shown in the flow chart 600 in FIG. 6, the recovery process operates by comparing checksums calculated by the primary system and the secondary system at or near a midpoint between the last known checksum match and the earliest known checksum mismatch. At step 630, the latest time at which a checksum match is known to have occurred, or $t_m$, is set equal to $t_k$, the time of the last-known reconciled condition of the primary system and the secondary system, and the earliest time at which a checksum mismatch is known to have occurred, or $t_x$, is set equal to $t_o$, the time at which a reconciliation failure is first identified. For example, if the system is configured to compare the primary checksum and the secondary checksum at midnight daily, time $t_o$ is midnight on the day that the reconciliation failure is first identified, and time $t_k$ is midnight on the previous day, when a reconciled condition is known to have existed. Additionally, the desired number of iterations n to be performed is also established, and iteration count i is set at 1.

At step 632, the secondary system requests that the primary system deliver the checksum P that it calculated according to the formula at or near a midpoint in time between $t_x$ and $t_m$, i.e., at or near an intermediate time $t_{int}=(t_x-t_m)/2$. For example, if the system is configured to compare the primary checksum and the secondary checksum at midnight daily, then the secondary system may request that the primary system deliver the checksum P that it calculated according to the formula at or near noon on the previous day. The secondary system then compares the value of the secondary checksum S that it calculated according to the formula at the intermediate time $t_{int}=(t_x-t_m)/2$, or $S((t_x-t_m)/2)$, to the primary checksum P calculated by the primary system at the intermediate time $t_{int}=(t_x-t_m)/2$, or $P((t_x-t_m)/2)$, at step 633.

At step 634, if the primary checksum P calculated at the intermediate time $t_{int}=(t_x-t_m)/2$ matches the secondary checksum S calculated at the intermediate time $t_{int}=(t_x-t_m)/2$, or if $P((t_x-t_m)/2)=S((t_x-t_m)/2)$, then it is known that the primary system was reconciled in the secondary system at the intermediate time $t_{int}=(t_x-t_m)/2$. Therefore, at step 635, the latest time at which a checksum match is known to have occurred, or $t_m$, is set to equal time $(t_x-t_m)/2$. If, at step 634, the primary checksum P calculated at time $(t_x-t_m)/2$ does not match the secondary checksum S calculated at the intermediate time $t_{int}=(t_x-t_m)/2$, or if $P((t_x-t_m)/2)\neq S((t_x-t_m)/2)$, then it is known that the primary system was not reconciled in the secondary system at the intermediate time $t_{int}=(t_x-t_m)/2$. Therefore, at step 636, the earliest time at which a checksum mismatch is known to have occurred, or $t_x$, is reset to equal time $(t_x-t_m)/2$.

Thus, after a reconciliation failure at time $t_o$ is identified, a single iteration of the method shown in the flow chart 600 in FIG. 6 may successfully divide the interval in which the earliest known transaction posted message failed to post in the secondary system in half. After a single iteration of steps 630 through 636, it is known that the earliest transaction posted message that failed to post occurred either before time $(t_o-t_k)/2$, or after time $(t_o-t_k)/2$. For example, if the system is set to compare the primary checksum and the secondary checksum at midnight daily, then, after a single iteration of steps 630 through 636, it is known that the earliest transaction posted message failed to post either before noon on a previous day, or after noon on that day.

At step 637, it is determined whether the desired number of iterations n has been performed. If the desired number of iterations n has not been performed, then the iteration count i is incremented by 1 at step 638, and steps 630 through 636 are repeated based on the new match time $t_m$, the new mismatch time $t_x$, and a new intermediate time $t_{int}$ calculated based on the new values of match time $t_m$, and mismatch time $t_x$.

Repeating steps 630 to 636 of the method shown in the flow chart 600 in FIG. 6 thus further narrows the remaining interval between the latest known checksum match and the earliest known checksum mismatch by half. Depending on whether a checksum match or a checksum mismatch is observed at step 634, then either the latest time at which a checksum match is known to have occurred, or $t_m$, reset to the value of $(t_x-t_m)/2$ at step 635, or the earliest time at which a checksum mismatch is known to have occurred, or $t_x$, is reset to the value of $(t_x-t_m)/2$ at step 636. Therefore, performing steps 630 to 636 through n iterations thus geometrically narrows the interval between the latest known checksum match and the earliest known checksum mismatch by a factor of $2^n$. For example, if three iterations of steps 630 to 636 are to be performed, or if n=3, then the interval between the latest known checksum match and the earliest known checksum mismatch is reduced by a factor of $2^3$, or to one-eighth of the original interval between time $t_o$ and time $t_k$.

Once the desired number of iterations n of steps 630 through 636 has been performed, the transaction posted messages which were recorded in the primary system 20 between time $t_m$ and time $t_x$ are retransmitted to the secondary system 30 at step 640, and are recorded in the secondary system 30 at step 642. At step 644, the secondary system 30 then recalculates the secondary checksum S as of time $t_o$, and the method returns to step 606. If, at step 610, the primary checksum P calculated at time $t_o$ matches the secondary checksum S recalculated as of time $t_o$, or if $P(t_o)=S(t_o)$, then it is known that the primary data source is successfully replicated in the secondary data source as of time $t_o$. If the primary checksum P calculated at time $t_o$ does not match the secondary checksum S recalculated as of time $t_o$, or if $P(t_o) \neq S(t_o)$, then the steps 630 through 638 may be repeated to further identify any additional transaction posted messages which were not recorded in the secondary system as of time $t_o$.

Figure 7:
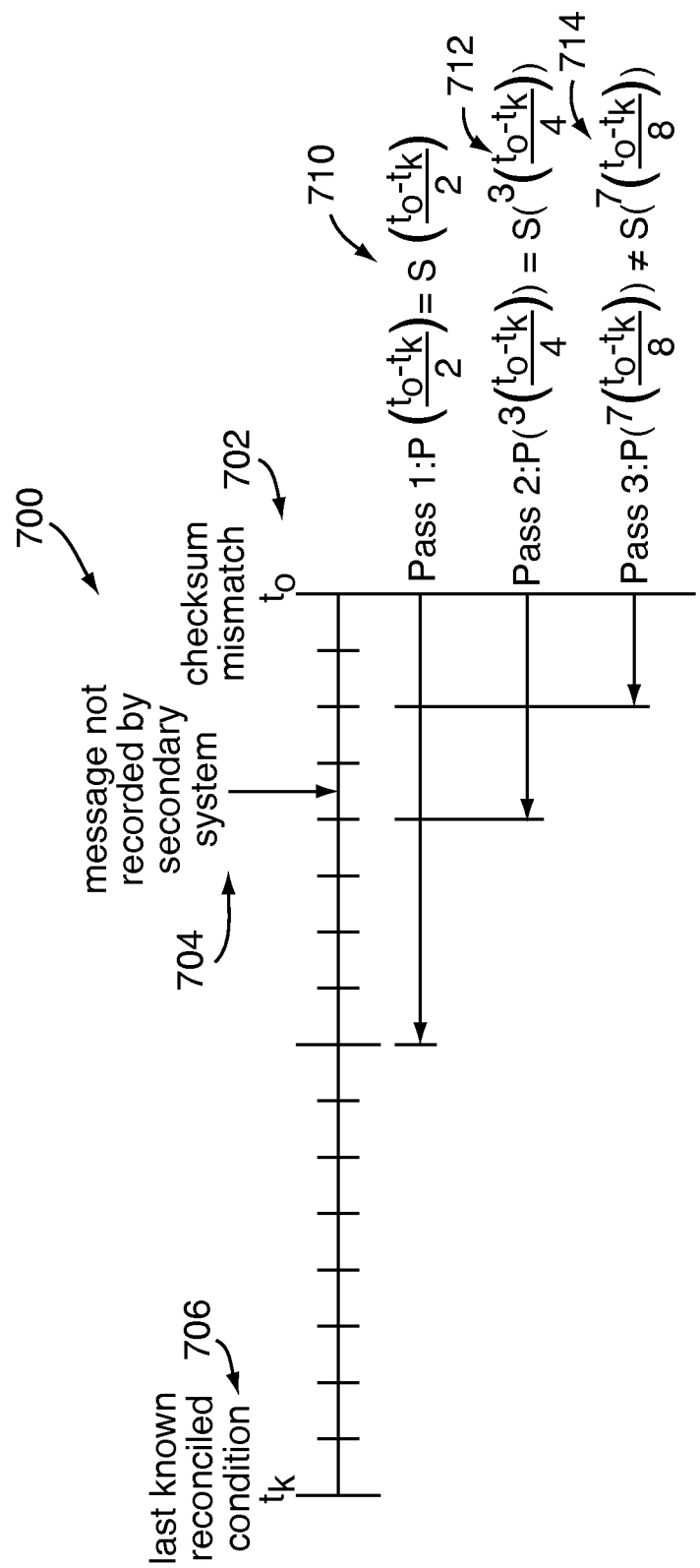
FIG. 7 is a time line of a recovery process in accordance with an embodiment of the present disclosure.

Referring to FIG. 7, a time line 700 extending from time 706, which represents the time $t_k$ of the last-known reconciled condition between the primary system and the secondary system, and time 702, which represents the time $t_o$ that a reconciliation failure is first identified. Additionally, the time line 700 also represents the time 704 at which a message was not recorded by the secondary system.

The time line 700 shown in FIG. 7 may represent the events of a recovery process according to an embodiment of the present disclosure such as method 600 shown in FIG. 6, which, through various iterations, splits the interval between the last known checksum match and the time of the most recent checksum mismatch in half, in order to minimize the length of time covered by the recovery process and, therefore, the amount of information that must be transferred from the primary system to the secondary system.

As is shown in FIG. 7, in a first pass 710, the primary checksum and the secondary checksum calculated at half the interval between the time $t_o$ and time $t_k$, i.e., at time $(t_o-t_k)/2$, are compared. When a checksum match is identified at time $(t_o-t_k)/2$, the primary checksum and the secondary checksum calculated at half the interval between the time $t_o$ and time $(t_o-t_k)/2$, i.e., at time $3(t_o-t_k)/4$, are compared in a second pass 712. When a checksum match is identified at time $3(t_o-t_k)/4$, the primary checksum and the secondary checksum calculated at half the interval between the time $t_o$ and time $3(t_o-t_k)/4$, i.e., at time $7(t_o-t_k)/8$, are compared in a third pass 714. When a checksum mismatch is identified at time $7(t_o-t_k)/8$, information pertaining to all of the financial transactions which were recorded in the primary system between time $3(t_o-t_k)/4$ and time $7(t_o-t_k)/8$ is transmitted from the primary system to the secondary system, and recorded there. As such, according to a recovery process that follows the time line 700 shown in FIG. 7, the time period over which information was required to be transferred from the primary system to the secondary system is geometrically reduced from $(t_o-t_k)$ to $1(t_o-t_k)/8$, or by a factor of eight, through three iterations. Therefore, the amount of information that must be transferred in order to reconcile the primary system in the secondary system, is greatly reduced, as compared to a recovery process that follows the time line 500 shown in FIG. 5.

Figure 8:
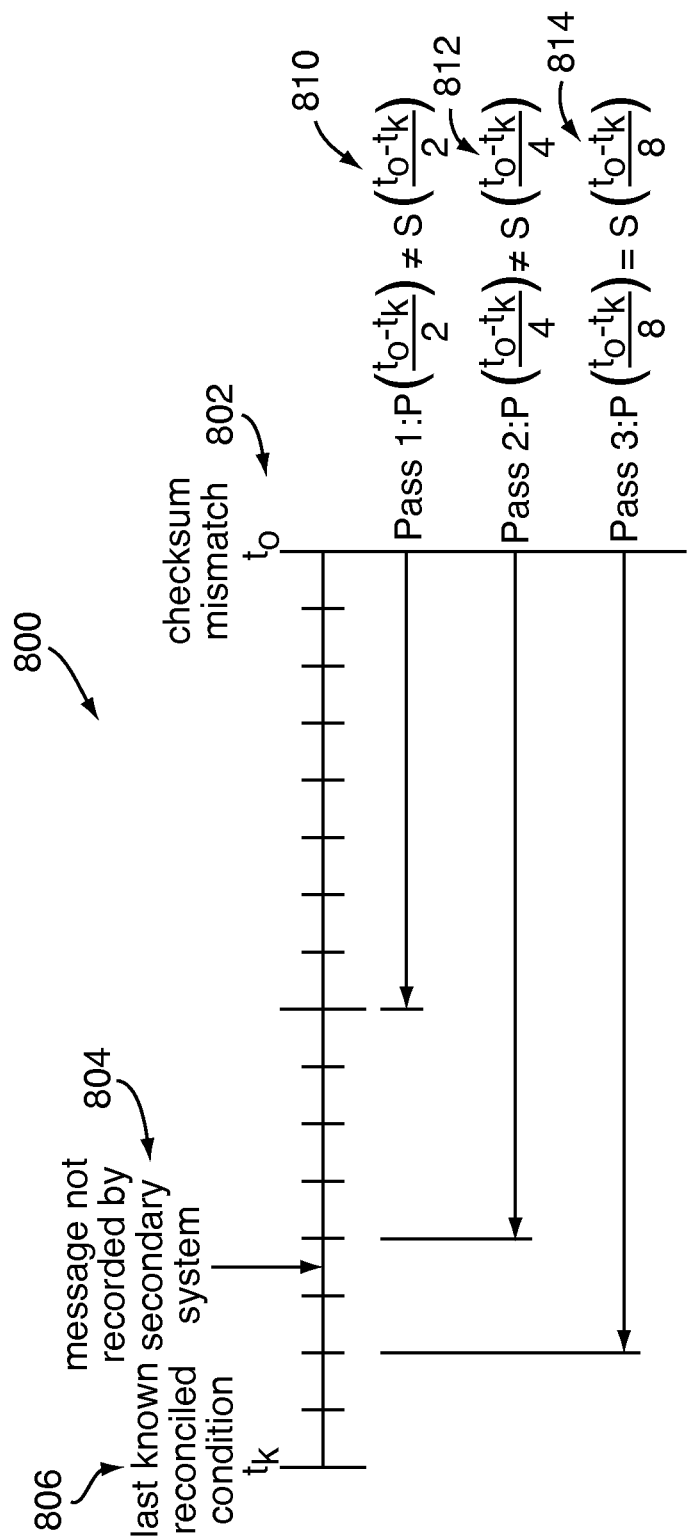
FIG. 8 is a time line of a recovery process in accordance with an embodiment of the present disclosure.

Referring to FIG. 8, a time line 800 extending from time 806, which represents the time $t_k$ of the last-known reconciled condition between the primary system and the secondary system, and time 802, which represents the time $t_o$ that a reconciliation failure is identified. Additionally, the time line 800 also represents the time 804 at which a message was not recorded by the secondary system. The time line 800 shown in FIG. 8 may also represent the events of a recovery process according to an embodiment of the present disclosure such as method 600 shown in FIG. 6.

As is shown in FIG. 8, the primary checksum and the secondary checksum calculated at half the interval between the time $t_o$ and time $t_k$, i.e., at time $(t_o-t_k)/2$, are compared in a first pass 810. When a checksum mismatch is identified at time $(t_o-t_k)/2$, the primary checksum and the secondary checksum calculated at half the interval between the time $t_k$ and time $(t_o-t_k)/2$, i.e., at time $(t_o-t_k)/4$, are compared in a second pass 812. When a checksum mismatch is identified at time $(t_o-t_k)/4$, the primary checksum and the secondary checksum calculated at half the interval between the time $t_k$ and time $(t_o-t_k)/4$, i.e., at time $(t_o-t_k)/8$, are compared in a third pass 814. When a checksum match is identified at time $(t_o-t_k)/8$, it is known that the earliest transaction posted message was not successfully recorded in the secondary system during the interval between time $(t_o-t_k)/8$ and time $(t_o-t_k)/4$. Therefore, information pertaining to all of the financial transactions which were recorded in the primary system between time $(t_o-t_k)/8$ and time $(t_o-t_k)/4$ may be retransmitted from the primary system to the secondary system, and recorded there. As with the time line 700 shown in FIG. 7, the events of a recovery process shown in time line 800 geometrically reduced the time period over which information was required to be transferred from the primary system to the secondary system from $(t_o-t_k)$ to $1(t_o-t_k)/8$, or by a factor of eight, through three iterations.

An embodiment of the present disclosure which divides the interval between the latest known checksum match and the earliest known checksum mismatch may be utilized even when more than one transaction posted message failed to post in the secondary system. For example, if transaction posted messages were not successfully recorded in the secondary system both at time 704 shown in FIG. 7 and at time 804 shown in FIG. 8, steps 630 through 638 of the method shown in flow chart 600 of FIG. 6 would first identify and recover from the reconciliation failure caused by the message which was not recorded at time 804 in FIG. 8. Next, assuming that the failed transaction posted message (or messages) was retransmitted at step 640 and successfully recorded in the secondary system at step 642, a checksum mismatch would still exist between the primary checksum $P(t_o)$ and the recalculated secondary checksum $S(t_o)$, due to the message which was not recorded in the secondary system at time 704 in FIG. 7. Steps 630 through 638 of the method shown in flow chart 600 of FIG. 6 could then be repeated to identify the message that was not recorded in the secondary system at time 704 in FIG. 7, and to recover from the reconciliation failure caused by that message, as well.

Although the disclosure has been described herein using exemplary techniques, algorithms, and/or processes for implementing the present disclosure, it should be understood by those skilled in the art that other techniques, algorithms and processes or other combinations and sequences of the techniques, algorithms and processes described herein may be used or performed that achieve the same function(s) and/or result(s) described herein and which are included within the scope of the present disclosure.

Those of skill in the art will recognize that the systems and methods of the present disclosure may be utilized to identify and recovery from reconciliation failures between a primary system and a secondary system which occur at any time, and such recoveries using the systems and methods described herein may be based on checksums that are calculated at intervals of any length of time, e.g., daily, hourly, or by the minute or second, or based on any number of transaction messages transmitted from a primary system to a secondary system, e.g., every 100 messages, every 50 messages or every message. Additionally, systems and methods which compare checksums at designated intervals after a reconciliation failure has been identified, may be employed using checksum intervals of any length of time, or checksum intervals defined by any number of checksums calculated by a primary system and a secondary system.

Furthermore, those of skill in the art will also recognize that systems and methods of the present which narrow the window between a known reconciled condition and a known reconciliation failure by comparing checksums calculated at or near a midpoint between the known reconciled condition and the known reconciliation failure may utilize any number of iterations to identify intervals in which messages were not successfully recorded in a secondary system. For example, a sufficient number of iterations may be followed to identify a precise time when an individual message was not successfully recorded in a secondary system.

Additionally, systems and methods of the present disclosure may also utilize intervals that are defined not by time but by numbers of checksums. For example, if it is known that a finite number of checksums were calculated by a primary system and a secondary system between a known reconciled condition and a known reconciliation failure, then the finite number of checksums may be divided by comparing the median primary checksum to the median secondary checksum through a number of iterations, in order to identify an individual checksum match or mismatch, and, therefore, a specific message that was not successfully recorded in the secondary system.

Those of skill in the art will also recognize that the systems and methods of the present disclosure are not limited to comparing primary checksums and secondary checksums calculated halfway between a known reconciled condition and a known reconciliation mismatch, and may instead be modified to compare primary checksums and secondary checksums calculated at other fractional intervals, e.g., one-third or one-fourth, to geometrically reduce the interval between a checksum match and a checksum mismatch, and to further reduce the amount of information and/or number of messages which must be retransmitted in order to reconcile a primary system with a secondary system. Additionally, those of skill in the art will also recognize that systems and methods of the present disclosure which compare checksums calculated at intervals descending in order counting backward from the time of the failed reconciliation may be modified to compare checksums to calculated at intervals ascending in order counting forward from the time of a known reconciled condition.

Various aspects of the systems and methods of the present disclosure may be further combined with one another, consistent with the teachings of the present invention, in order to reconcile a primary system and a secondary system. For example, aspects of systems and methods of the present disclosure which compare checksums calculated at intervals in series may be combined with aspects of systems and methods of the present disclosure which geometrically reduce the interval between a checksum match and a checksum mismatch in order to simplify a recovery process, to make a recovery process more efficient, or for any other reason.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods of for performing financial reconciliation between two systems using checksums in which functions may be deleted or executed out of order from that shown or discussed, including substantially concurrently or in reverse order, depending on the functionality involved, as would be understood by those reasonably skilled in the art. For example, those of ordinary skill in the art would realize that the systems and methods described herein may be used to replicate source data from a system of record to one or more secondary systems.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having a computer-executable component for causing a computer system to perform a method for reconciling financial information comprising:

providing a primary system adapted to store a first plurality of data containing at least one key field value and a secondary system adapted to store a second plurality of data containing the at least one key field value;

performing a comparison of a first primary checksum calculated according to a formula based at least in part on the at least one key field value in the first plurality of data at a first predetermined time to a first secondary checksum calculated according to the formula based at least in part on the at least one key field value in the second plurality of data at the first plurality of time; and initiating a recovery process upon identifying the checksum mismatch at the first predetermined time, wherein the recovery process comprises:

(a) identifying a second predetermined time at which the contents of the first plurality of data stored in the primary system corresponded with the second plurality of data stored in the secondary system;

(b) defining a match time as the second predetermined time, defining a mismatch time as the first predetermined time, and defining an intermediate time between the match time and the mismatch time;

(c) performing a comparison of a second primary checksum calculated according to the formula based at least in part on the at least one key field value in the first plurality of data at the intermediate time to a second secondary checksum calculated according to the formula based at least in part on the at least one key field value in the second plurality of data at the intermediate time;

(d) if the second primary checksum matches the second secondary checksum, redefining the match time as the intermediate time;

(e) if the second primary checksum does not match the second secondary checksum, redefining the mismatch time as the intermediate time;

(f) if a predetermined number of iterations of comparisons has not been performed, redefining the intermediate time as a time between the match time and the mismatch time, and repeating (c), (d) and (e); and (g) transmitting at least one message containing information that was contained in the first plurality of data at the mismatch time and was not contained in the first plurality of data at the match time.

2. A computer-implemented method for performing a reconciliation of a primary data source and a secondary data source comprising:

under control of a computing device configured with specific computer-executable instructions, providing a formula, wherein the formula is adapted to calculate a checksum based at least in part on a status of a data source at a particular time;

comparing a first primary checksum to a first secondary checksum, wherein the first primary checksum and the first secondary checksum are calculated according to the formula based at least in part on a status of the primary data source at a first time and a status of the secondary data source at the first time, respectively; and performing a recovery process if the first primary checksum does not match the first secondary checksum, wherein the recovery process comprises:

(a) identifying a second time at which a second primary checksum matches a second secondary checksum, wherein the second primary checksum and the second secondary checksum are calculated according to the formula based at least in part on a status of the primary data source at the second time and a status of the secondary data source at the second time, respectively; and (b) transferring a plurality of information to the secondary data source, wherein at least some of the plurality of information was stored in the primary data source at the first time and was not stored in the primary data source at the second time.

3. The computer-implemented method according to claim 2, wherein the status of the data source on which the formula bases its calculation at least in part is the presence of at least one key field value in a data source.

4. The computer-implemented method according to claim 3, wherein the key field value is monotonically non-decreasing.

5. The computer-implemented method according to claim 2, wherein the information is transmitted via electronic mail.

6. A computer-implemented method for performing a reconciliation of a primary data source and a secondary data source comprising:

under control of a computing device configured with specific computer-executable instructions, providing a formula, wherein the formula is adapted to calculate a checksum based at least in part on a status of a data source at a particular time;

comparing a first primary checksum to a first secondary checksum, wherein the first primary checksum and the first secondary checksum are calculated according to the formula based at least in part on a status of the primary data source at a first time and a status of the secondary data source at the first time, respectively; and performing a recovery process if the first primary checksum does not match the first secondary checksum, wherein the recovery process comprises:

(a) identifying a second time at which a second primary checksum matches a second secondary checksum, wherein the second primary checksum and the second secondary checksum are calculated according to the formula based at least in part on a status of the primary data source at the second time and a status of the secondary data source at the second time, respectively, wherein the second time is earlier than the first time;

(b) determining whether a third primary checksum matches a third secondary checksum at a third time, wherein the third primary checksum and the third secondary checksum are calculated according to the formula based at least in part on a status of the primary data source at the third time and a status of the secondary data source at the third time, respectively, and wherein the third time is later than the second time and earlier than the first time.

7. The computer-implemented method according to claim 6, wherein identifying a second time comprises comparing a second primary checksum to a second secondary checksum, wherein the second primary checksum is calculated according to the formula based at least in part on a status of the primary data source at the second time, wherein the second secondary checksum is calculated according to the formula based at least in part on a status of the secondary data source at the second time, and wherein the second time is earlier than the first time.

8. The computer-implemented method according to claim 7, wherein the second time and the first time are separated by a regular interval.

9. The computer-implemented method according to claim 8, wherein the regular interval is selected from the group consisting of one day and one hour.

10. The computer-implemented method according to claim 6, wherein the recovery process further comprises:

(c) if the third primary checksum matches the third secondary checksum, transferring a plurality of information to the secondary data source, wherein at least some of the plurality of information was stored in the primary data source at the first time and was not stored in the primary data source at the third time; and (d) if the third primary checksum does not match the third secondary checksum, transferring a plurality of information to the secondary data source, wherein at least some of the plurality of information was stored in the primary data source at the third time and was not stored in the primary data source at the second time.

11. The computer-implemented method according to claim 6, wherein the recovery process further comprises:

(c) if the third primary checksum matches the third secondary checksum, identifying a fourth time at which a fourth primary checksum matches a fourth secondary checksum, wherein the fourth primary checksum and the fourth secondary checksum are calculated according to the formula based at least in part on a status of the primary data source at the fourth time and a status of the secondary data source at the fourth time, respectively, and transferring a plurality of information to the secondary data source, wherein the fourth time is later than the third time and earlier than the first time, and wherein at least some of the plurality of information was stored in the primary data source at the first time and was not stored in the primary data source at the fourth time; and (d) if the third primary checksum does not match the third secondary checksum, identifying a fourth time at which a fourth primary checksum matches a fourth secondary checksum, wherein the fourth primary checksum and the fourth secondary checksum are calculated according to the formula based at least in part on a status of the primary data source at the fourth time and a status of the secondary data source at the fourth time, respectively, and transferring a plurality of information to the secondary data source, wherein the fourth time is later than the second time and earlier than the third time, and wherein at least some of the plurality of information was stored in the primary data source at the third time and was not stored in the primary data source at the fourth time.

12. A computer-implemented method for performing a reconciliation of a primary data source and a secondary data source comprising:

under control of a computing device configured with specific computer-executable instructions, providing a formula, wherein the formula is adapted to calculate a checksum based at least in part on a status of a data source at a particular time;

comparing a first primary checksum to a first secondary checksum, wherein the first primary checksum and the first secondary checksum are calculated according to the formula based at least in part on a status of the primary data source at a first time and a status of the secondary data source at the first time, respectively; and performing a recovery process if the first primary checksum does not match the first secondary checksum, wherein the recovery process comprises:

(a) identifying a second time at which a second primary checksum matches a second secondary checksum, wherein the second primary checksum and the second secondary checksum are calculated according to the formula based at least in part on a status of the primary data source at the second time and a status of the secondary data source at the second time, respectively, wherein the second time is earlier than the first time; and (b) setting a mismatch time $t_x$ to equal the first time and setting a match time $t_m$ to equal the second time;

(c) calculating an intermediate time $t_{int}$ according to the equation $t_{int}=(t_x-t_m)/2$;

(d) comparing a third primary checksum to a third secondary checksum, wherein the third primary checksum and the third secondary checksum are calculated according to the formula based at least in part on a status of the primary data source at the intermediate time $t_{int}$ and a status of the secondary data source at the intermediate time $t_{int}$, respectively;

(e) if the third primary checksum matches the third secondary checksum, resetting the match time $t_m$ to equal the intermediate time $t_{int}$;

(f) if the third primary checksum does not match the third secondary checksum, resetting the mismatch time $t_x$ to equal the intermediate time $t_{int}$;

(g) if a predetermined number of iterations of the recovery process has not been performed, recalculating the intermediate time $t_{int}$ according to the equation $t_{int}=(t_x-t_m)/2$, and repeating (d), (e) and (f); and (h) transmitting at least one message containing information that was contained in the first plurality of data at the mismatch time $t_x$ and was not contained in the first plurality of data at the match time $t_m$ to the secondary data source.

13. The computer-implemented method according to claim 12, wherein the information transmitted in (h) of the recovery process relates to at least one financial transaction.

14. The computer-implemented method according to claim 13, wherein the at least one financial transaction relates to at least one of a fulfillment of an order or a placement of a subscription charge.

15. A computer-implemented method for reconciling information comprising:

under control of a computing device configured with specific computer-executable instructions, providing a primary system comprising a primary data source, wherein the primary data source is adapted to store primary data containing at least one key field value;

providing a secondary system comprising a secondary data source, wherein the secondary data source is adapted to store secondary data containing the at least one key field value;

using a formula to calculate a primary checksum based at least in part on the at least one key field value in the primary data at a first predetermined time;

using the formula to calculate a secondary checksum based at least in part on the at least one key field value in the secondary data at the first predetermined time;

comparing the primary checksum calculated at the first predetermined time to the secondary checksum calculated at the first predetermined time to identify a checksum mismatch; and upon identifying the checksum mismatch, performing a recovery process, wherein the recovery process comprises:

(a) using the formula to calculate a primary checksum based at least in part on the at least one key field value in the primary data at a second predetermined time, wherein the second predetermined time precedes the first predetermined time;

(b) using the formula to calculate a secondary checksum based at least in part on the at least one key field value in the secondary data at the second predetermined time;

(c) comparing the primary checksum calculated based at least in part on the at least one key field value in the primary data at the second predetermined time to the secondary checksum calculated based at least in part on the at least one key field value in the primary data at the second predetermined time to identify a checksum match or a checksum mismatch;

(d) if a checksum mismatch is identified, decrementing the second predetermined time by an interval, and repeating (a), (b) and (c) until a checksum match is identified; and (e) if a checksum match is identified, transmitting at least one message comprising information that was contained in the primary data source at the second predetermined time and was not contained in the primary data source at the first predetermined time to the primary system, and recording the information in the secondary system.

16. The computer-implemented-method according to claim 15, wherein the method further comprises using the formula to recalculate a secondary checksum based at least in part on the at least one key field value in the secondary data store after the information has been recorded in the secondary system, and comparing the recalculated secondary checksum to the primary checksum based at least in part on the at least one key field value in the primary data at a first predetermined time.

17. The computer-implemented method according to claim 15, wherein at least one of the first predetermined time, the second predetermined time or the interval is determined based at least in part on at least one of a logical clock and a physical clock.

18. The computer-implemented method according to claim 15, wherein the interval is selected from the group consisting of one hour and one minute.

19. A computer-implemented method for reconciling information comprising:

under control of a computing device configured with specific computer-executable instructions, providing a primary system comprising a primary data source, wherein the primary data source is adapted to store primary data containing at least one key field value;

providing a secondary system comprising a secondary data source, wherein the secondary data source is adapted to store secondary data containing the at least one key field value;

using a formula to calculate a primary checksum based at least in part on the at least one key field value in the primary data at a first predetermined time;

using the formula to calculate a secondary checksum based at least in part on the at least one key field value in the secondary data at the first predetermined time;

comparing the primary checksum calculated at the first predetermined time to the secondary checksum calculated at the first predetermined time to identify a checksum mismatch; and upon identifying the checksum mismatch, performing a recovery process, wherein the recovery process comprises:

(a) setting a mismatch time $t_o$ to equal the first time;

(b) setting a test time $t_i$ to equal the test time $t_o$ less an interval a, according to the equation $t_i=(t_o-a)$;

(c) comparing a second primary checksum to a second secondary checksum, wherein the second primary checksum and the second secondary checksum are calculated according to the formula based at least in part on a status of the primary data source at the test time $t_i$ and a status of the secondary data source at the test time $t_i$, respectively;

(d) if the second primary checksum does not match the second secondary checksum, decrementing the test time $t_i$ by the interval a and repeating (c); and (e) if the second primary checksum matches the second secondary checksum, transmitting at least one message to the secondary data source, wherein the at least one message contains information that was contained in the first plurality of data at the mismatch time $t_o$ and was not contained in the first plurality of data at the test time $t_i$.

20. The computer-implemented method according to claim 19, wherein the at least one message contains information that was contained in the first plurality of data at the time $(t_i+a)$, and was not contained in the first plurality of data at the test time $t_i$.

21. The computer-implemented method according to claim 19, wherein the method further comprises comparing the first primary checksum to a third secondary checksum, and wherein the third secondary checksum is calculated according to the formula based at least in part on a status of the primary data source after the at least one message has been transmitted to the secondary data source.

22. A system for storing financial information comprising:

a primary system having a primary data source and a primary computer executable component; and a secondary system having a secondary data source and a secondary executable component, wherein the primary computer executable component is adapted to cause a primary computer to perform a method comprising:

recording information pertaining to at least one financial transaction in the primary data source, wherein the information comprises at least one key value corresponding to the at least one financial transaction;

transmitting the information to the secondary system over a network; and calculating a primary checksum according to a formula based at least in part on the at least one key field values stored in the primary data source at a predetermined time; and wherein the secondary computer executable component is adapted to cause a secondary computer to perform a method comprising:

receiving the information from the primary system over the network;

recording the information in the secondary data source;

calculating a secondary checksum according to a formula based at least in part on the at least one key field values stored in the secondary data source at the predetermined time; and comparing the primary checksum calculated at the first predetermined time to the secondary checksum calculated at the first predetermined time to identify a checksum mismatch, wherein, upon identification of the checksum mismatch, the secondary computer executable component is further adapted to cause the secondary computer to perform a recovery method comprising:
(a) comparing a primary checksum calculated at a second predetermined time to a secondary checksum calculated at the second predetermined time;
(b) if the primary checksum calculated at the second predetermined time does not match the secondary checksum calculated at the second predetermined time, decrementing the second predetermined time by an interval, and repeating (a) and (b);
(c) if the primary checksum calculated at the second predetermined time matches the secondary checksum calculated at the second predetermined time, receiving a plurality of data from the primary system, wherein the plurality of data was stored in the primary data source at the second predetermined time but was not stored in the primary data source at the first predetermined time.

23. The system according to claim 22, wherein at least one of the primary system and the secondary system is adapted to transmit a report.

24. The system according to claim 22, wherein at least one of the primary system and the secondary system is adapted to disburse funds.

25. The system according to claim 22, wherein at least one of the first predetermined time, the second predetermined time and the interval is determined based at least in part on at least one of a logical clock and a physical clock.

* * * * *